Patented Jan. 26, 1932

1,842,390

UNITED STATES PATENT OFFICE

LLOYD C. DANIELS, OF CRAFTON, CHRISTIAN J. SCHWINDT, OF PITTSBURGH, AND ALPHONS O. JAEGER, OF MOUNT LEBANON, PITTSBURGH, PENNSYLVANIA, ASSIGNORS, BY MESNE ASSIGNMENTS, TO THE SELDEN RESEARCH & ENGINEERING CORPORATION, OF PITTSBURGH, PENNSYLVANIA, A CORPORATION OF DELAWARE

ANTHRAQUINONE PRODUCT

No Drawing. Application filed March 22, 1930. Serial No. 438,236.

This invention relates to an anthraquinone product and methods of preparing the same.

In the past anthraquinone from the catalytic oxidation of anthracene has been obtained in the main in needle crystals, especially when the product has been purified by sublimation, the commercially most attractive process. The silky needles in which the anthraquinone crystallizes are usually of high chemical purity but possess a number of disadvantages. In the first place the apparent density of the crystals is low so that the cost of containers is greatly increased, and they are difficult to pour from ordinary containers such as, for example, barrels. A further disadvantage lies in the fact that they dissolve somewhat slowly and this has led to attempts to grind anthraquinone so as to obtain a more rapid solution and reaction, particularly in sulphonation reactions in the production of alizarin and similar compounds. Pulverized anthraquinone has many advantages. In the first place it contains a very large amount of dust which makes its handling difficult, and a serious fire danger is presented for the fine dust when mixed with air can form a combustible or even an explosive mixture. The fire danger is still further enhanced by the fact that ground anthraquinone tends to take on a high charge of static electricity. The grinding process is also an expensive one and adds considerably to the cost of the product, although in some cases it has been used despite its expense where the advantages of rapid solution and reaction have been necessary, particularly in sulphonation reactions.

The present invention is based on the surprising discovery that crystalline anthraquinone in the form of needle crystals can be comminuted or torn to a powder, without grinding, rapidly and very cheaply and the process is substantially free from dusting in comparison to the grinding process. The product resembles a brilliant yellow flour which is more or less coarse, depending on the length of the comminution process. Where the process is very short, small fragments of crystalline needles may also be noticed in the product, and for most purposes it is unnecessary to comminute to the point where all of the crystals are disintegrated, it being sufficient to disintegrate the crystals above a certain size. The comminuted anthraquinone flour has a high apparent density, almost double that of the needle crystals, which permits cutting the container cost in half, and also results in a saving in freight where, as is usual, the charge is primarily on the basis of volume rather than weight.

The more or less coarse flour produced by the present invention can be handled easily and dissolves with remarkable ease. It is suitable for use in all sulphonation reactions without any further disintegration as its solubility and speed of reaction are sufficiently enhanced over that of needle crystals to permit excellent results in the manufacture of silver salt and similar sulphonation reactions.

The needle crystals of anthraquinone are apparently disintegrated with astonishing ease into the coarse flour and any machine having disintegrating or tearing action may be employed. So easy is the comminution of the needles that even machines which are apparently utterly unsuitable, such as dough-mixing machines with rotary mixing arms can be used with great effect. There is no tendency of the needle crystals to wrap around the arms and the operation is of extraordinary rapidity. In small machines crystals can be transformed into a flour in less than a minute and even in the largest machines the operation proceeds with great rapidity. As but little fine dust is formed, the fire hazard is greatly reduced, particularly when the comminuting machine is carefully grounded to avoid the formation of charges of static electricity.

The present invention can be carried out in any suitable disintegrator such as, for example, a dough-mixing machine or machines used in the comminution of cellulose fibers and can be carried out either as a batch process in machines which require batch operation or as a continuous process in continuous feed disintegrators. The disintegration when carried out as a batch process may be effected by incorporating a large fraction of the batch at one time, but is preferably effected by feeding the needle crystals in smaller portions as the power required for disintegration rises rapidly with high feed rates.

The invention can be practiced with any suitable disintegrator which does not grind the product so as to produce dust, and the invention is not limited to any particular type of disintegrator, the general types mentioned above being merely illustrative examples of a few common types in which the process can be carried out.

What is claimed as new is:

As a new product, comminuted crystalline anthraquinone substantially free from finely ground product.

Signed at Pittsburgh, Pennsylvania, this 19th day of March, 1930.

LLOYD C. DANIELS.
CHRISTIAN J. SCHWINDT.
ALPHONS O. JAEGER.